United States Patent
Silver et al.

(10) Patent No.: US 11,561,552 B2
(45) Date of Patent: Jan. 24, 2023

(54) DETECTING ENVIRONMENT CHANGES USING SURFEL DATA

(71) Applicant: Waymo LLC, Mountain View, CA (US)

(72) Inventors: David Harrison Silver, San Carlos, CA (US); Carlos Hernandez Esteban, Kirkland, WA (US); Michael Montemerlo, Mountain View, CA (US); Peter Pawlowski, Menlo Park, CA (US); David Yonchar Margines, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 318 days.

(21) Appl. No.: 17/021,828

(22) Filed: Sep. 15, 2020

(65) Prior Publication Data

US 2022/0083073 A1 Mar. 17, 2022

(51) Int. Cl.
*G05D 1/02* (2020.01)
*G06V 10/75* (2022.01)
(Continued)

(52) U.S. Cl.
CPC ......... *G05D 1/0251* (2013.01); *G05D 1/0219* (2013.01); *G06V 10/757* (2022.01); *G06V 20/56* (2022.01); *H04W 4/46* (2018.02)

(58) Field of Classification Search
CPC .. G05D 1/0251; G05D 1/0219; G06V 10/757; G06V 20/56; G06V 20/647; H04W 4/46; H04W 4/44
See application file for complete search history.

(56) References Cited

U.S. PATENT DOCUMENTS 6,509,902 B1 * 1/2003 Pfister ................... G06T 5/20
345/582
6,580,425 B1 * 6/2003 Zwicker ............... G06T 15/205
345/420

(Continued)

OTHER PUBLICATIONS

Behley et al., "Efficient Surfel-Based SLAM using 3D Laser Range Data in Urban Environments," Robotics: Science and Systems, 2018, 10 pages.

(Continued)

*Primary Examiner* — Bhavesh V Amin
(74) *Attorney, Agent, or Firm* — Fish & Richardson P.C.

(57) ABSTRACT

Methods, systems, and apparatus, including computer programs encoded on computer storage media, for processing data characterizing a first region in an environment to generate a prediction characterizing a second region in the environment. One of the methods includes obtaining surfel data comprising a plurality of surfels; obtaining sensor data for a plurality of locations in a first region of the environment; determining, from the surfel data, a plurality of first surfels corresponding to respective locations in the first region of the environment; determining, using the first surfels and the sensor data, a difference between i) a first representation of the first region of the environment corresponding to the first surfels and ii) a second representation of the first region of the environment corresponding to the sensor data; and generating a respective object prediction for one or more locations in a second region of the environment.

20 Claims, 6 Drawing Sheets

(51) Int. Cl.
*G06V 20/56* (2022.01)
*H04W 4/46* (2018.01)

(56) References Cited

U.S. PATENT DOCUMENTS

| | | | | |
|---|---|---|---|---|
| 6,583,787 | B1* | 6/2003 | Pfister | G06T 15/005 |
| | | | | 345/441 |
| 11,417,110 | B2* | 8/2022 | Anguelov | G06V 10/803 |
| 2016/0071278 | A1* | 3/2016 | Leonard | G06T 7/579 |
| | | | | 348/47 |
| 2017/0248963 | A1* | 8/2017 | Levinson | B60Q 5/006 |
| 2018/0364717 | A1* | 12/2018 | Douillard | G06T 7/11 |
| 2019/0026943 | A1* | 1/2019 | Yan | G06T 7/586 |
| 2019/0147220 | A1* | 5/2019 | McCormac | G06V 20/64 |
| | | | | 382/103 |
| 2019/0278292 | A1* | 9/2019 | Levinson | G05D 1/024 |
| 2019/0339361 | A1* | 11/2019 | Fechner | G01S 13/931 |
| 2020/0080848 | A1* | 3/2020 | Sprague | G01S 17/89 |
| 2020/0257900 | A1* | 8/2020 | Dubroy | G06V 20/56 |
| 2021/0380125 | A1* | 12/2021 | Hernandez Esteban | |
| | | | | G06V 30/18143 |
| 2021/0381843 | A1* | 12/2021 | Montemerlo | G06V 20/56 |
| 2022/0063662 | A1* | 3/2022 | Sprunk | G06V 20/58 |
| 2022/0076030 | A1* | 3/2022 | Anguelov | G06K 9/6256 |
| 2022/0082408 | A1* | 3/2022 | Montemerlo | G06V 20/56 |
| 2022/0083073 | A1* | 3/2022 | Silver | G06V 20/647 |
| 2022/0097726 | A1* | 3/2022 | Buchanan | G05D 1/0214 |
| 2022/0097731 | A1* | 3/2022 | Xu | G06V 10/56 |
| 2022/0108119 | A1* | 4/2022 | Margines | G06V 10/25 |
| 2022/0204019 | A1* | 6/2022 | Lauterbach | G06V 10/44 |

OTHER PUBLICATIONS

Park et al., "Probabilistic Surfel Fusion for Dense LiDAR Mapping," Proceedings of the IEEE International Conference on Computer Vision, 2017, pp. 2418-2426.
Pfister et al., "Surfels: surface elements as rendering primitives." Proceedings of the 27th annual conference on Computer graphics and interactive techniques, 2000, pp. 335-342.
Schops et al., "SurfelMeshing: Online Surfel-Based Mesh Reconstruction," CoRR, Oct. 2018, arxiv.org/abs/1810.00729v1, 13 pages.
Stuckler et al., "Efficient Mobile Robot Navigation using 3D Surfel Grid Maps," In Proc. of the German Conference on Robotics, May 2012, 5 pages.
Stuckler et al., "Multi-Resolution Surfel Maps for Efficient Dense 3D Modeling and Tracking," Journal of Visual Communication and Image Representation, Jan. 2014, 25(1):137-147.
Wang et al., "Real-time Scalable Dense Surfel Mapping," 2019 International Conference on Robotics and Automation, May 2019, pp. 6919-6925.

* cited by examiner

DETECTING ENVIRONMENT CHANGES USING SURFEL DATA

BACKGROUND

This specification relates to automatic planning of autonomous vehicle driving decisions.

Autonomous vehicles include self-driving cars, boats, and aircraft. Autonomous vehicles use a variety of on-board sensors in tandem with map representations of the environment in order to make control and navigation decisions.

Some vehicles use a two-dimensional or a 2.5-dimensional map to represent characteristics of the operating environment. A two-dimensional map associates each location, e.g., as given by latitude and longitude, with some properties, e.g., whether the location is a road, or a building, or an obstacle. A 2.5-dimensional map additionally associates a single elevation with each location. However, such 2.5-dimensional maps are problematic for representing three-dimensional features of an operating environment that might in reality have multiple elevations. For example, overpasses, tunnels, trees, and lamp posts all have multiple meaningful elevations within a single latitude/longitude location on a map.

SUMMARY

This specification describes how a vehicle operating in an environment, e.g. an autonomous or semi-autonomous vehicle, can use an existing surfel map and new sensor data to detect changes in the environment. In particular, a system on-board the vehicle can obtain i) sensor data representing a first region of the environment from one or more sensors on-board the vehicle and ii) surfel data representing both the first region of the environment and a second region of the environment that is different from the first region, e.g. surfel data that has been generated by one or more vehicles navigating through the environment at respective previous time points. The system can process the sensor data representing the first region of the environment to determine that a change has occurred in the second region of the environment, relative to the surfel representation of the second region of the environment. That is, the system can determine that the second region has changed without observing the second region itself.

Particular embodiments of the subject matter described in this specification can be implemented so as to realize one or more of the following advantages.

Systems described in this specification can process existing data characterizing an environment (e.g., surfel data) and new sensor data captured of the environment to determine or predict that a change has occurred in a region of the environment that has not been observed, i.e., is not represented by the new sensor data. The system can use this information to make better-informed driving decisions. For example, a system on-board a vehicle can process the new sensor data (e.g., sensor data captured by one or more sensors on-board the vehicle) to generate a prediction about a region of the environment that the vehicle has not navigated through or otherwise observed. As a particular example, the system on-board the vehicle can process sensor data that characterizes traffic cones within the range of the sensors of the vehicle to generate a prediction characterizing a construction area that is outside the range of the sensors of the vehicle.

Furthermore, the on-board system can use the determined change to update a global surfel representation that is used by multiple different vehicles. For example, the system can upload i) the new sensor data, ii) the predictions generated from the new sensor data, or iii) both to a server system that is accessible by multiple different vehicles. Then, other vehicles operating in the environment can use the predicted change in the second region of the environment to make driving decisions, even though none of the vehicles may have observed the second region itself.

Some existing systems use a 2.5-dimensional system to represent an environment, which limits the representation to a single element having a particular altitude for each (latitude, longitude) coordinate in the environment. Using techniques described in this specification, a system can instead leverage a three-dimensional surfel map to make autonomous driving decisions. The three-dimensional surfel map allows multiple different elements at respective altitudes for each (latitude, longitude) coordinate in the environment, yielding a more accurate and flexible representation of the environment.

Some existing systems rely entirely on existing representations of the world, generated offline using sensor data generated at previous time points, to navigate through a particular environment. These systems can be unreliable, because the state of the environment might have changed since the representation was generated offline or since the environment was last observed. Some other existing systems rely entirely on sensor data generated by the vehicle at the current time point to navigate through a particular environment. These systems can be inefficient, because they fail to leverage existing knowledge about the environment that the vehicle or other vehicles have gathered at previous time points. Using techniques described in this specification, an on-board system can combine an existing surfel map and online sensor data to generate a prediction for the state of the environment. The existing surfel data allows the system to get a jump-start on the prediction and plan ahead for regions that are not yet in the range of the sensors of the vehicle, while the sensor data allows the system to be agile to changing conditions in the environment.

Using a surfel representation to combine the existing data and the new sensor data can be particularly efficient with respect to the time, memory, and processing power required. Using techniques described in this specification, a system can quickly integrate new sensor data with the data in the surfel map to generate a representation that is also a surfel map. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that must be untangled. Updating the mesh can therefore be a lengthy and computationally expensive process.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
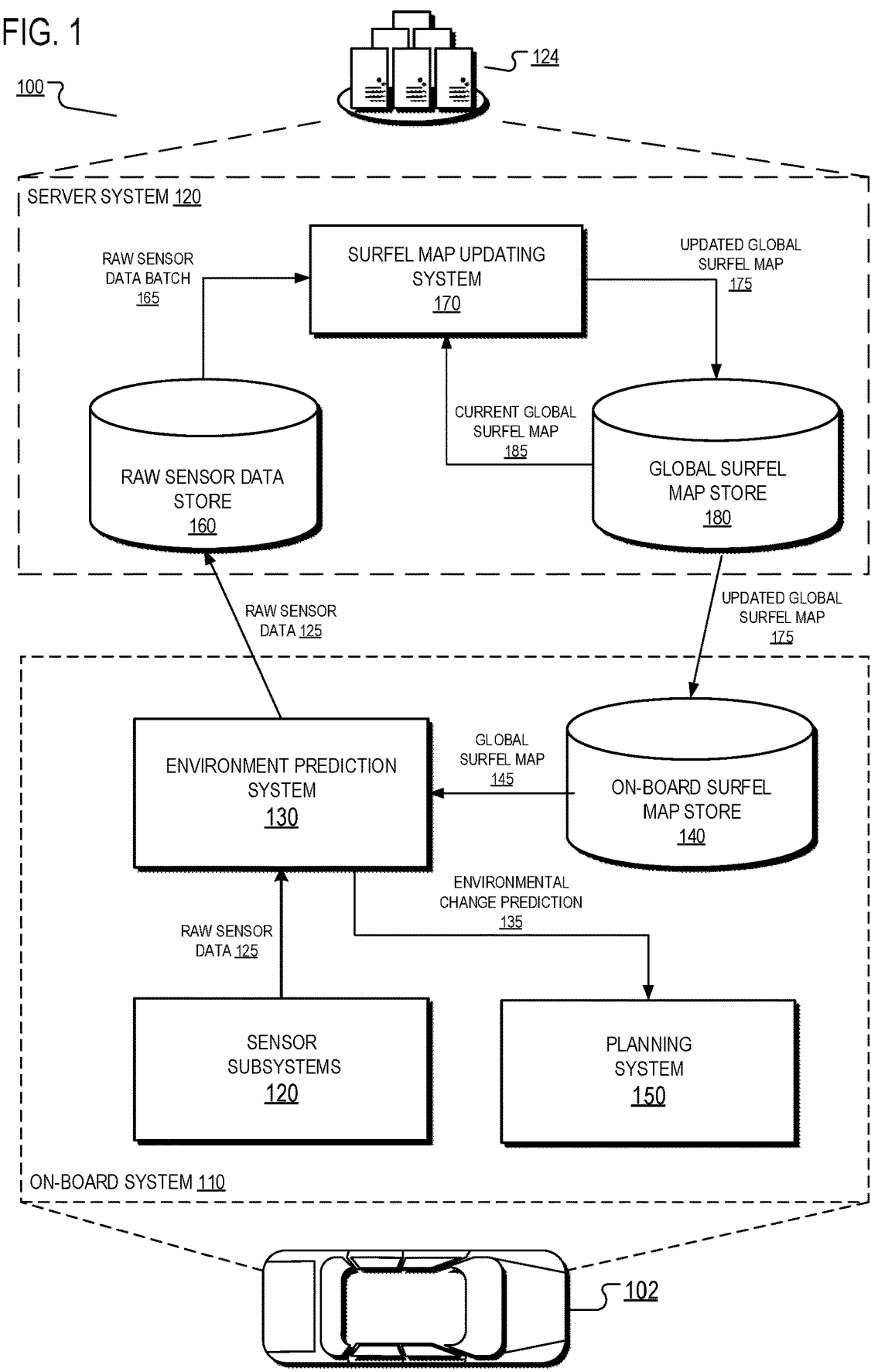
FIG. 1 is a diagram of an example system.

This specification describes how a vehicle, e.g., an autonomous or semi-autonomous vehicle, can use a surfel map to make autonomous driving decisions.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g. a vector with a magnitude of 1, that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g. one or more labels describing the surface or object characterized by the surfel. As a particular example, if a surfel map represents a portion of a city block, then each surfel in the surfel map can have a semantic label identifying the object that is being partially characterized by the surfel, e.g. "streetlight," "stop sign," "mailbox," etc.

A surfel map can characterize a real-world environment, e.g. a particular portion of a city block in the real world, or a simulated environment, e.g. a virtual intersection that is used to simulate autonomous driving decisions to train one or more machine learning models. As a particular example, a surfel map characterizing a real-world environment can be generated using sensor data that has been captured by sensors operating in the real-world environment, e.g. sensors on-board a vehicle navigating through the environment. In some implementations, an environment can be partitioned into multiple three-dimensional volumes, e.g. a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 120 which every vehicle in the system 100 can access.

The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g. an object or another vehicle represented in a surfel map. The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 120 classify one or more groups of raw sensor measurements as being measures of a respective object of a particular type, the sensor subsystems 120 can compile the raw sensor measurements into a set of raw sensor data 125, and send the raw data 125 to an environment prediction system 130.

The on-board system 110 also includes an on-board surfel map store 140 that stores a global surfel map 145 of the real-world. The global surfel map 145 is an existing surfel map that has been generated by combining sensor data captured by multiple vehicles navigating through the real world.

Generally, every vehicle in the system 100 uses the same global surfel map 145. In some cases, different vehicles in the system 100 can use different global surfel maps 145, e.g. when some vehicles have not yet obtained an updated version of the global surfel map 145 from the server system 120.

Each surfel in the global surfel map 145 can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel, e.g. "pole" with probability 0.8, "street sign" with probability 0.15, and "fire hydrant" with probability 0.05.

The environment prediction system 130 can receive the global surfel map 145 and combine it with the raw sensor data 125 to generate an environmental change prediction 135. The environmental change prediction 135 includes data that characterizes a prediction for the current state of the environment, including predictions for an object or surface at one or more locations in the environment.

The raw sensor data 125 might show that the environment through which the vehicle 102 is navigating has changed. In some cases, the changes might be large and discontinuous, e.g., if a new building has been constructed or a road has been closed for construction since the last time the portion of the global surfel map 145 corresponding to the environment has been updated. In some other cases, the changes might be small and continuous, e.g., if a bush grew by an inch or a leaning pole increased its tilt. In either case, the raw sensor data 125 can capture these changes to the world, and the environment prediction system 130 can use the raw sensor data to update the data characterizing the environment stored in the global surfel map 145 to reflect these changes in the environmental change prediction 135.

For one or more objects represented in the global surfel map 145, the environment prediction system 130 can use the raw sensor data 125 to determine a probability that the object is currently in the environment. In some implementations, the environment prediction system 130 can use a Bayesian model to generate the predictions of which objects are currently in the environment, where the data in the global surfel map 145 is treated as a prior distribution for the state of the environment, and the raw sensor data 125 is an observation of the environment. The environment prediction system 130 can perform a Bayesian update to generate a posterior belief of the state of the environment, and include this posterior belief in the environmental change prediction 135. In some implementations, the raw sensor data 125 also has a probability distribution for each object detected by the sensor subsystem 120 describing a confidence that the object is in the environment at the corresponding location; in some other implementations, the raw sensor data 125 includes detected objects with no corresponding probability distribution.

For example, if the global surfel map 145 includes a representation of a particular object, and the raw sensor data 125 includes a strong detection of the particular object in the same location in the environment, then the environmental change prediction 135 can include a prediction that the object is in the location with high probability, e.g. 0.95 or 0.99. If the global surfel map 145 does not include the particular object, but the raw sensor data 125 includes a strong detection of the particular object in the environment, then the environmental change prediction 135 might include a weak prediction that the object is in the location indicated by the raw sensor data 125, e.g. predict that the object is at the location with probability of 0.5 or 0.6. If the global surfel map 145 does include the particular object, but the raw sensor data 125 does not include a detection of the object at the corresponding location, or includes only a weak detection of the object, then the environmental change prediction 135 might include a prediction that has moderate uncertainty, e.g. assigning a 0.7 or 0.8 probability that the object is present.

That is, the environment prediction system 130 might assign more confidence to the correctness of the global surfel map 145 than to the correctness of the raw sensor data 125. In some other implementations, the environment prediction system 130 might assign the same or more confidence to the correctness of the sensor data 125 than to the correctness of the global surfel map 145. In either case, the environment prediction system 130 does not treat the raw sensor data 125 or the global surfel map 145 as a ground-truth, but rather associates uncertainty with both in order to combine them. Approaching each input in a probabilistic manner can generate a more accurate environmental change prediction 135, as the raw sensor data 125 might have errors, e.g. if the sensors in the sensor subsystems 120 are miscalibrated, and the global surfel map 145 might have errors, e.g. if the state of the world has changed.

In some implementations, the environmental change prediction 135 can also include a prediction for each class of semantic information for each object in the environment. For example, the environment prediction system 130 can use a Bayesian model to update the associated data of each surfel in the global surfel map 145 using the raw sensor data 125 in order to generate a prediction for each semantic class and for each object in the environment. For each particular object represented in the global surfel map 145, the environment prediction system 130 can use the existing labels of semantic information of the surfels corresponding to the particular object as a prior distribution for the true labels for the particular object. The environment prediction system 130 can then update each prior using the raw sensor data 125 to generate posterior labels and associated probabilities for each class of semantic information for the particular object. In some such implementations, the raw sensor data 125 also has a probability distribution of labels for each semantic class for each object detected by the sensor subsystem 120; in some other such implementations, the raw sensor data 125 has a single label for each semantic class for each detected object.

Continuing the previous particular example, where a particular surfel characterizes a pole with probability 0.8, a street sign with probability 0.15, and fire hydrant with probability 0.05, if the sensor subsystems 120 detect a pole at the same location in the environment with high probability, then the Bayesian update performed by the environment prediction system 130 might generate new labels indicating that the object is a pole with probability 0.85, a street sign with probability 0.12, and fire hydrant with probability 0.03. The new labels and associated probabilities for the object are added to the environmental change prediction 135.

The environment prediction system 130 can provide the environmental change prediction 135 to a path planning system 150 of the vehicle 102, which can use the environment prediction 130 to make autonomous driving decisions, e.g., generating a planned trajectory for the vehicle 102 through the environment. For example, the path planning system 150 can be configured to process an input that includes i) the environment change prediction 135 and ii) a roadgraph of the environment, and to generate a planned path of the vehicle 102 through the roadgraph. A roadgraph is an image representation of the environment, e.g., a top-down image of the environment, that can include representation of the features of the roads in the environment such as the lanes of the road, cross walks, traffic lights, stop signs, etc.

In some cases, the raw sensor data 125 does not represent the full environment of the vehicle 102; that is, there are portions of the environment for which the sensor subsystems 120 do not capture data. For example, the environment might include an object that obstructs the sensors from capturing data corresponding to a region behind the object, e.g., the region behind a building or a large vehicle. As another example, the sensors in the sensor subsystems 120 might have a range that is smaller than the size of the environment, so that the raw sensor data 125 does not represent the regions of the environment that are outside the range of the sensors.

In these cases, the environment prediction system 130 can generate an environmental change prediction 135 that includes predictions about the regions of the environment that are not represented by the raw sensor data 125. For example, the environment prediction system 130 can detect a difference in a representation of a first region of the environment given by the raw sensor data 125 and a representation of the first region of the environment given by the global surfel map 145, where the first region has been observed by the sensors of the sensor subsystems 120. That is, the environment (as observed by the sensor subsystems 120) has changes since the generation of the global surfel map 145. The environment prediction system 130 can then use this determined change in the first region to determine a change in a second region of the environment that has not been observed by the sensor subsystems 120. This process is discussed in more detail below with respect to FIG. 3A and FIG. 3B.

The environment prediction system 130 can also provide the raw sensor data 125 to a raw sensor data store 160 located in the server system 120.

The server system 120 is typically hosted within a data center 124, which can be a distributed computing system having hundreds or thousands of computers in one or more locations.

The server system 120 includes a raw sensor data store 160 that stores raw sensor data generated by respective vehicles navigating through the real world. As each vehicle captures new sensor data characterizing locations in the real world, each vehicle can provide the sensor data to the server system 120. The server system 120 can then use the sensor data to update the global surfel map that every vehicle in the system 100 uses. That is, when a particular vehicle discovers that the real world has changed in some way, e.g. construction has started at a particular intersection or a street sign has been taken down, the vehicle can provide sensor data to the server system 120 so that the rest of the vehicles in the system 100 can be informed of the change.

As discussed above with respect to the environment predictions system 130, in some implementations, the server system 120 can use the raw sensor data 125 corresponding to a first region of the environment to generate a prediction about a second region of the environment that is not represented by the raw sensor data 125.

The server system 120 also includes a global surfel map store 180 that maintains the current version of the global surfel map 185.

A surfel map updating system 170, also hosted in the server system 120, can obtain the current global surfel map 185 and a batch of raw sensor data 165 from the raw sensor data store 160 in order to generate an updated global surfel map 175. In some implementations, the surfel map updating system 170 updates the global surfel map at regular time intervals, e.g. once per hour or once per day, obtaining a batch of all of the raw sensor data 165 that has been added to the raw sensor data store 160 since the last update. In some other implementations, the surfel map updating system 170 updates the global surfel map whenever a new raw sensor data 125 is received by the raw sensor data store 160.

In some implementations, the surfel map updating system 170 generates the updated global surfel map 175 in a probabilistic way.

In some such implementations, for each measurement in the batch of raw sensor data 165, the surfel map updating system 170 can determine a surfel in the current global surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current global surfel map 185 as a prior distribution. The surfel map updating system 170 can then update the prior using the measurement to generate posterior distribution for the corresponding location. This posterior distribution is then included in the associated data of the corresponding surfel in the updated global surfel map 175.

If there is not currently a surfel at the location of a new measurement, then the surfel map updating system 170 can generate a new surfel according to the measurement.

In some such implementations, the surfel map updating system 170 can also update each surfel in the current global surfel map 185 that did not have a corresponding new measurement in the batch of raw sensor data 165 to reflect a lower certainty that an object is at the location corresponding to the surfel. In some cases, e.g. if the batch of raw sensor data 165 indicates a high confidence that there is not an object at the corresponding location, the surfel map updating system 170 can remove the surfel from the updated global surfel map 175 altogether. In some other cases, e.g. when the current global surfel map 185 has a high confidence that the object characterized by the surfel is permanent and therefore that the lack of a measurement of the object in the batch of raw sensor data 165 might be an error, the surfel map updating system 170 might keep the surfel in the updated global surfel map 175 but decrease the confidence of the updated global surfel map 175 that an object is at the corresponding location.

After generating the updated global surfel map 175, the surfel map updating system 170 can store it in the global surfel map store 180, replacing the stale global surfel map 185. Each vehicle in the system 100 can then obtain the updated global surfel map 175 from the server system 120, e.g., through a wired or wireless connection, replacing the stale version with the retrieved updated global surfel map 175 in the on-board surfel map store 140. In some implementations, each vehicle in the system 100 retrieves an updated global surfel map 175 whenever the global surfel map is updated and the vehicle is connected to the server system 120 through a wired or wireless connection. In some other implementations, each vehicle in the system 100 retrieves the most recent updated global surfel map 175 at regular time intervals, e.g. once per day or once per hour.

Figure 2A:
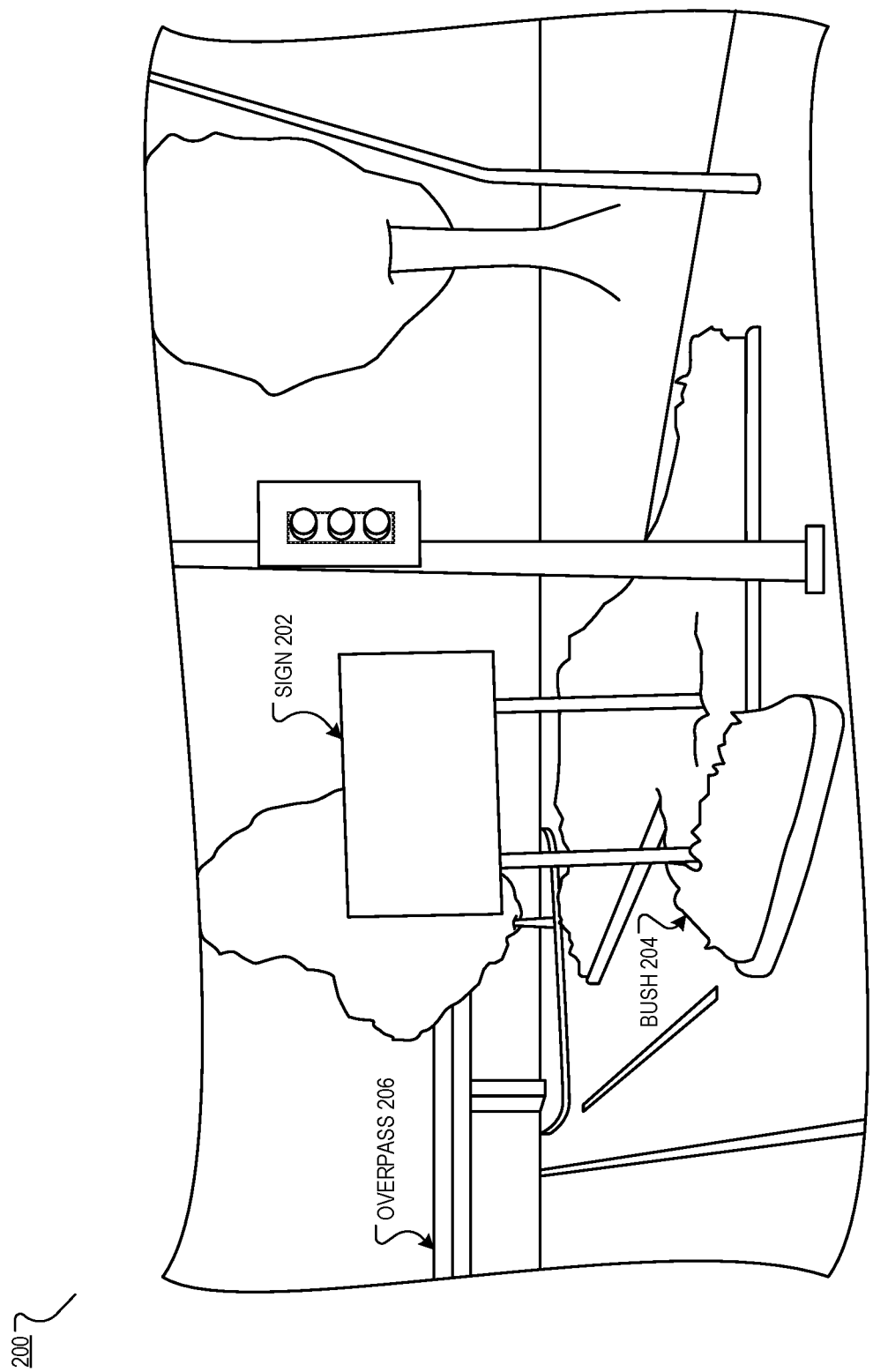
FIG. 2A is an illustration of an example environment.

FIG. 2A is an illustration of an example environment 200. The environment 200 is depicted from the point of view of a sensor on-board a vehicle navigating through the environment 200. The environment 200 includes a sign 202, a bush 204, and an overpass 206.

Figure 2B:
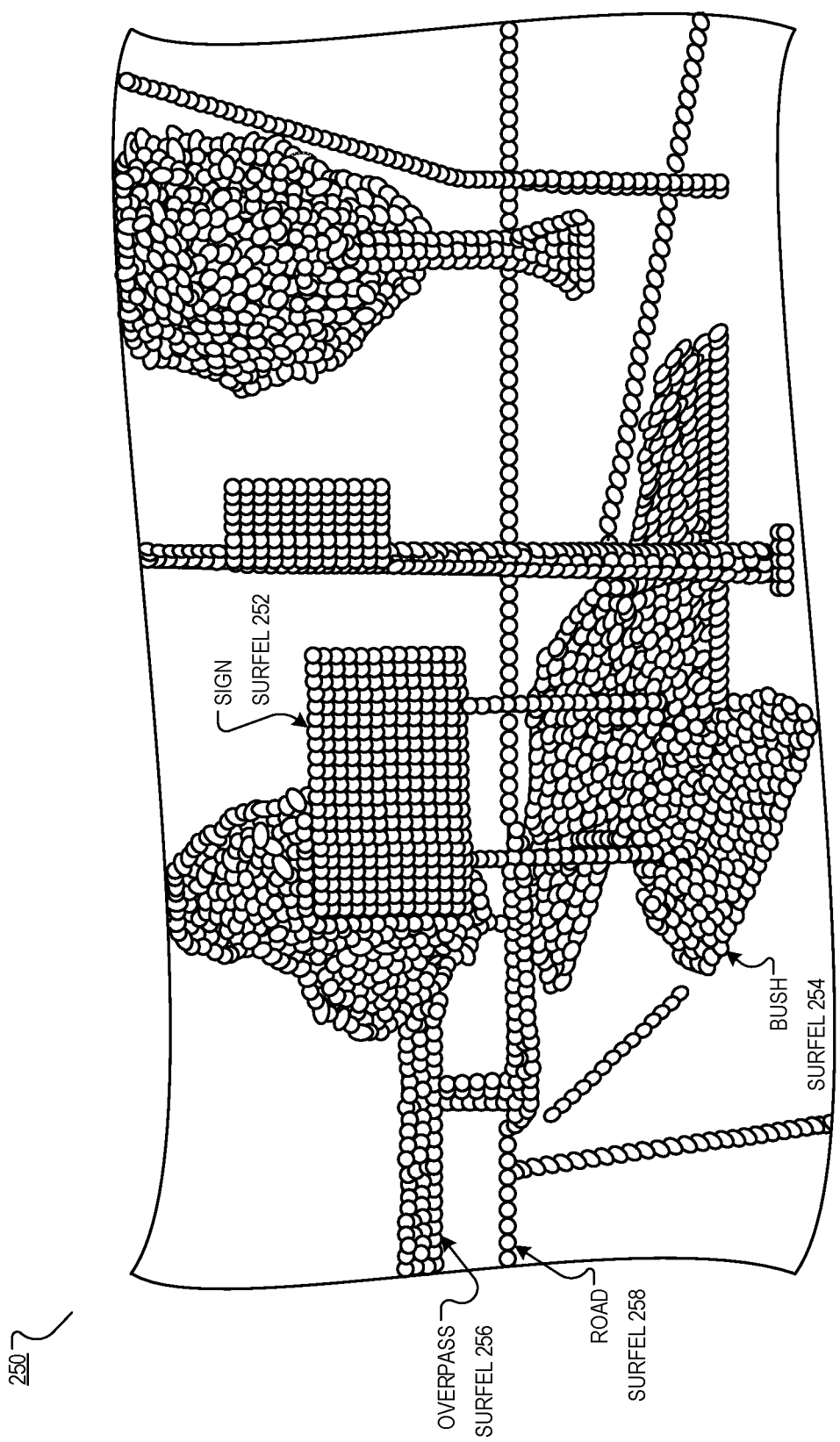
FIG. 2B is an illustration of an example surfel map of the environment of FIG. 2A.

FIG. 2B is an illustration of an example surfel map 250 of the environment 200 of FIG. 2A.

Each surfels in the surfel map 250 is represented by a disk, and defined by three coordinates (latitude, longitude, altitude), that identify a position of the surfel in a common coordinate system of the environment 200 and by a normal vector that identifies an orientation of the surfel. For example, each voxel can be defined to be the disk that extends some radius, e.g. 1, 10, 25, or 100 centimeters, around the (latitude, longitude, altitude) coordinate. In some other implementations, the surfels can be represented as other two-dimensional shapes, e.g. ellipsoids or squares.

The environment 200 is partitioned into a grid of equal-sized voxels. Each voxel in the grid of the environment 200 can contain at most one surfel, where, e.g., the (latitude, longitude, altitude) coordinate of each surfel defines the voxel that the surfel occupies. That is, if there is a surface of an object at the location in the environment corresponding to a voxel, then there can be a surfel characterizing the surface in the voxel; if there is not a surface of an object at the location, then the voxel is empty. In some other implementations, a single surfel map can contain surfels of various different sizes that are not organized within a fixed spatial grid.

Each surfel in the surfel map 250 has associated data characterizing semantic information for the surfel. For example, as discussed above, for each of multiple classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "permanent" label might have a high probability for surfels characterizing vegetation. Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicted that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

As another example, the surfel map 250 includes a bush surfel 254 that characterizes a portion of the bush 204 depicted in FIG. 2A. The bush surfel 254 might have labels predicted that the type of the object characterized by the bush surfel 254 is "bush" with probability 0.75 and "tree" with probability 0.25. Because bushes can grow, be trimmed, and die with relative frequency, the "permanent" label for the bush surfel 254 might be 0.2. The bush surfel 254 might have color labels predicting the color of the bush 204 to be "green" with probability 0.7 and "yellow" with probability 0.3. Because the bush 204 is not completely opaque and does not reflect a lot of light, an opacity label of the bush surfel 254 might predict that the sign is "opaque" with probability 0.7 and a reflectivity label of the sign surfel 252 might predict that the sign is "reflective" with probability 0.4.

Note that, for any latitude and longitude in the environment 200, i.e. for any given (latitude, longitude) position in a plane running parallel to the ground of the environment 200, the surfel map 250 can include multiple different surfels each corresponding to a different altitude in the environment 200, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 206 in the environment 200 and the road underneath the overpass 205. The surfel map, on the other hand, is able to represent both the overpass 206 and the road underneath the overpass 206, e.g. with an overpass surfel 256 and a road surfel 258 that have the same latitude coordinate and longitude coordinate but a different altitude coordinate.

Figure 3A:
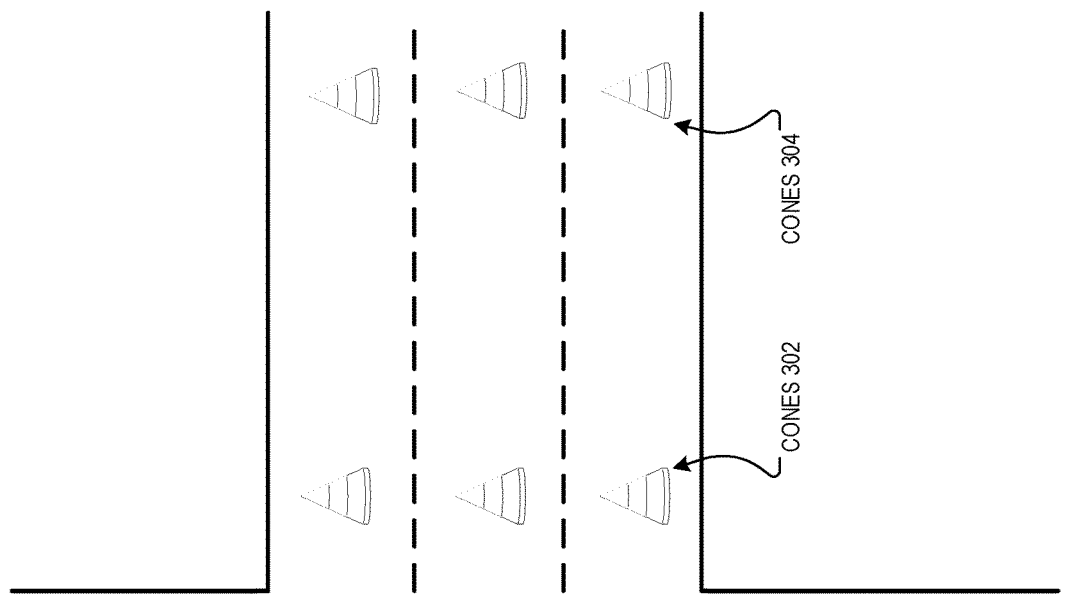
FIGS. 3A and 3B are illustrations of an example environment that has changed.
Figure 3A:
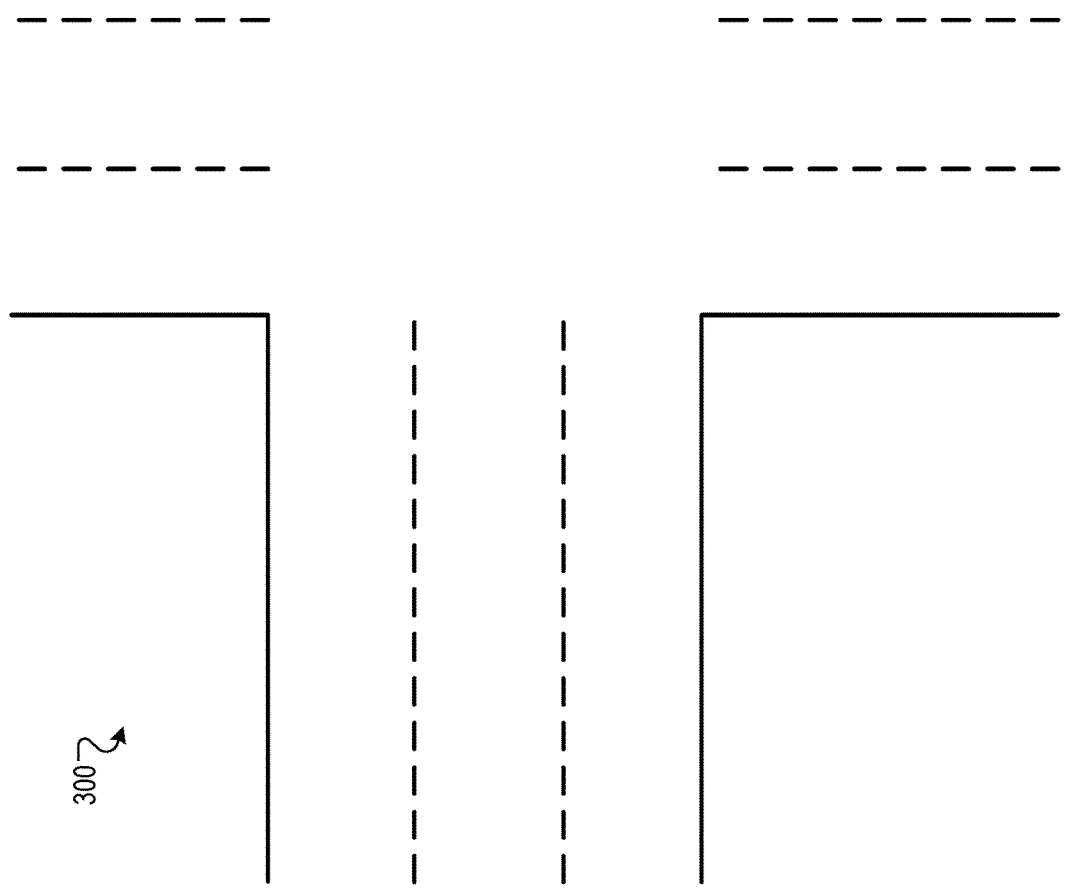

FIG. 3A is an illustration of an example environment 300.

The environment includes a crossroad, where one of the four roads of the crossroad is closed for construction. The road is closed off from traffic by two rows of traffic cones: a first row of cones 302 closing a first side of the road, and a second row of cones 304 closing a second side of the road.

The environment 300 might be represented by a surfel map that includes many surfels characterizing respective surfaces in the environment 300. For example, each cone might be represented by multiple surfels with associated data classifying the surfels as "cone" surfels, i.e., classifying the surface represented by the surfels as the surface of a cone.

In some implementations, the surfels representing the traffic cones 302 and 304 can all be associated in the surfel data with the construction site. For example, each surfel in the surfel data can have a "construction" tag that is '1' if the surfel represents a surface of the construction site and that is '0' otherwise. As another example, the surfel data might include a roadgraph that identifies the construction site, e.g., with a dynamic roadgraph feature characterized on the roadgraph by a bounding box or other polygon.

Figure 3B:
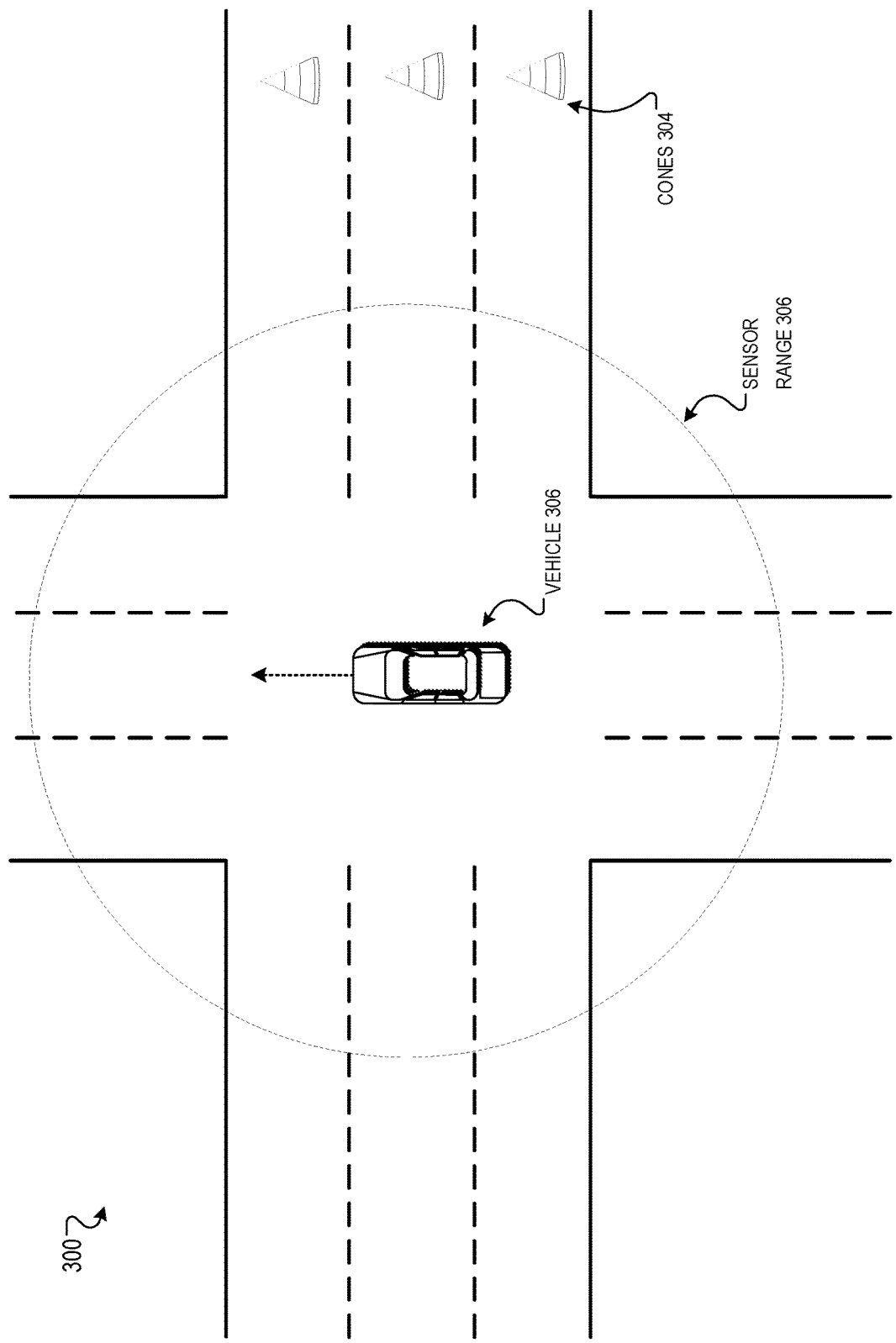

FIG. 3B is an illustration of the environment 300 after a change has occurred. A vehicle 306 is navigating through the environment and is capturing sensor data using one or more on-board sensors. In particular, the vehicle 306 is navigating in the direction of the arrow, i.e., past the road that was previously closed for construction. The vehicle 306 can capture sensor data characterizing the environment up to a sensor range 306; outside of the sensor range 306, the vehicle 306 cannot observe the environment using the on-board sensors.

The vehicle 306 can obtain the surfel data described above with respect to FIG. 3A; that is, the vehicle can obtain surfel data characterizing the environment before the change occurs. The sensor data shows that the environment 300 has changed; in particular, the first row of cones 302 has been removed. The sensor range 306, however, is not large enough to observe the second row of cones 304, and so the vehicle 306 does not have data characterizing whether or not the second row of cones 304 is still in the environment 300.

The vehicle 306 can combine the obtained surfel data and the new sensor data to generate a prediction for the current state of the environment 300. In some existing techniques, the vehicle 306 would simply remove the data characterizing the first row of cones 302 from the current representation of the environment (because the vehicle 306 has observed that the first row of cones 302 has been removed), but would leave the data characterizing the second row of cones 304 in the current representation of the environment (because the vehicle 306 has not observed that the second row of cones 304 has been removed). That is, using some existing techniques, the vehicle 306 would not update the representation of the region of the environment 300 outside of the sensor range 306.

However, using the techniques described in this specification, the vehicle 306 can use the sensor data, characterizing the region of the environment 300 within the sensor range 306, to generate an updated prediction for the current state of the region of the environment 300 outside of the sensor range 306.

Given that the first row of cones 302 has been removed, it is likely that the construction has been completed, and therefore likely that the second row of cones 304 has also been removed. Therefore, the vehicle 306 might remove the representation of the cones 304 from the current representation of the environment. That is, the vehicle 306 can remove the surfels corresponding to the second row of cones 304. As another example, the vehicle 306 might keep the surfels corresponding to the second row of comes 304 in the current representation of the environment, but decrease the probability that the surface represented by the cone surfels exists. That is, the vehicle 306 can decrease the probability in the associated data of the cone surfels; for example, if the probability in the associated data of the cone surfels in the obtained surfel data was 0.9, the vehicle 306 might reduce the probability to 0.5 or 0.1. As a particular example, in order to reduce the probability of the cone surfels in the associated data of the cone surfels, the vehicle 306 can identify each cone surfel in the list of "construction" surfels described above with respect to FIG. 3A.

In the implementations in which a construction site is represented by a feature on a roadgraph maintained by the vehicle 306, in response to observing that the first row of cones 302 has been remove, the vehicle 306 might update the polygon characterizing the construction zone in the roadgraph. For example, the vehicle 306 might shrink the polygon to fit the changes to the environment, i.e., so that the polygon does not overlap with the region within the sensor range 306 that has been observed to no longer include a construction site. As another example, the vehicle 306 might remove the polygon entirely, if the vehicle 306 determines, using the updated representation of the environment 300, that the construction site has with a high likelihood been removed from the environment 300. That is, even though the vehicle 306 has not directly observed that the portion of the construction site outside of the sensor range 306 has been removed, the vehicle 306 might remove the feature representing the construction site from the roadgraph if the vehicle 306 determines, according to the sensor data characterizing the region of the environment within the sensor range 306, that there is a high likelihood that the construction site has been removed.

As another example, the sensor data might show that the first row of cones 302 is still in the environment 300, but has been shifted by some distance, e.g., 10 meters down the road. In this example, the vehicle 306 might lower the probability, in the updated representation of the environment 300, that the second row of cones 304 is in the location described in the obtained surfel data. Instead or in addition, the vehicle 306 might generate a predicted representation of the environment that includes, with some non-zero probability, cone surfels that are 10 meters past where the second row of cones 304 is located in the obtained surfel data; that is, the vehicle 306 might assign some probability to the event that the entire construction site has been shifted by 10 meters.

Alternatively, the sensor data might show that the first row of cones 302 is in the exact same location that is described in the obtained surfel data; that is, that the environment 300 has not changed within the sensor range 306. In this example, the vehicle 306 might increase the probability, in the updated representation of the environment 300, that the second row of cones 304 is in the location described in the obtained surfel data. For example, if the associated data of the surfels characterizing the second row of cones 304 had a probability of 0.8, then the vehicle 306 might increase the probability to 0.9 or 0.95.

As another example, the sensor data might show that the status of one or more of the lanes has changed. For example, the sensor data might show that one of the three lanes to the left of the vehicle 306 has been closed, or that a lane that had been for traffic going in one direction has become a lane for traffic going in the opposing direction. In this example, the vehicle 306 might increase the probability, in the updated representation of the environment 300, that the portion of the road to the left of the vehicle 306 that is outside of the sensor range 306 will also have changes in the same way, i.e., that the unobserved portion of the road also has a closed lane or a lane for which the direction of traffic has changed. Even though the vehicle 306 has not directly observed such changes farther down the road, the vehicle can infer with a high probability, and thus increase the corresponding probability in the updated representation, that the changes observed within the sensor range 306 were implemented outside of the sensor range 306.

In some implementations, the vehicle 306 can upload the updated representation of the environment 300 to a server system that is accessible by other vehicle. The other vehicles can then obtain the updated representation and use the updated representation to make driving decisions. For example, whereas using the existing surfel data a vehicle might have avoided a route that included the road that was previously under construction, using the updated representation (where the first row of cones 302 has been removed and the second row of cones 304 has a lower probability of existing), the vehicle might generate a route that includes the road that was previously under construction. For example, the change in probability of the second row of cones 304 might slightly change a penalty associated with travelling along the road in an optimization problem executed by a system of the vehicle that generates the intended routes of the vehicle. This slight change in the penalty can cause the route that takes the road that was previously under construction to be the optimal route.

Figure 4:
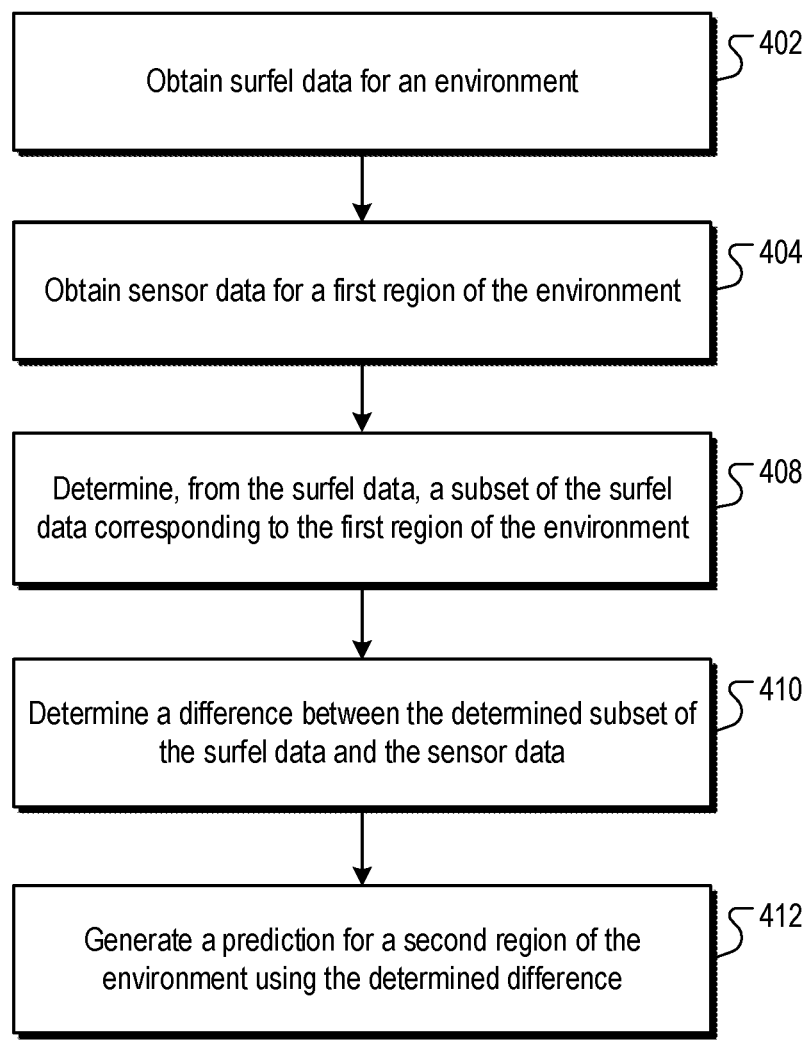
FIG. 4 is a flow diagram of an example process for determining a change in an environment.

FIG. 4 is a flow diagram of an example process for determining a change in an environment. For convenience, the process 400 will be described as being performed by a system of one or more computers located in one or more locations. For example, an environment prediction system, e.g., the environment prediction system 130 depicted in FIG. 1, appropriately programmed in accordance with this specification, can perform the process 400.

The system obtains surfel data for an environment (step 402). The surfel data can include multiple surfels that each correspond to a respective different location in the environment.

Each surfel in the surfel data can also have associated data. For example, the associated data of each surfel can include a respective class prediction for each of one or more other classes of semantic information for the surface represented by the surfel, e.g., object type, reflectivity, opacity, color, etc. As another example, associated data for each surfel can include a prediction that characterizes a likelihood that an object is at the location corresponding to the surfel. In some implementations, the surfel data is represented using a voxel grid, where each surfel in the surfel data corresponds to a different voxel in the voxel grid.

The system obtains sensor data for one or more locations in a first region of the environment (step 404). The sensor data has been captured by one or more sensors of a vehicle navigating in the environment, e.g., the sensor subsystems 120 of the vehicle 102 depicted in FIG. 1.

In some implementations, the surfel data obtained in step 402 has been generated from data captured by one or more vehicles navigating through the environment at respective previous time points, e.g., the same vehicle that captured the sensor data and/or other vehicles.

The system determines, from the surfel data, a subset of the surfel data that corresponds to the first region of the environment (step 408). For example, the system can determine each surfel in the obtained surfel data that characterizes a surface in the first region of the environment. The system can use the (x, y, z) location of each surfel, in a common coordinate system of the environment, to determine whether the surfel is in the first region of the environment.

The system determines a difference between the determined subset of the surfel data and the sensor data (step 410). That is, the system can determine a difference between i) a first representation of the first region of the environment corresponding to the determined subset of the surfel data and ii) a second representation of the first region of the environment corresponding to the sensor data.

The system generates a prediction for a second region of the environment using the determined difference (step 412). That is, the system can generate a prediction for one or more locations, e.g., location corresponding to surfels in the surfel data, that are in the second region. The second region of the environment is different than the first region. For example, the first region of the environment can be the region within a sensor range of the vehicle, and the second region of the environment can include one or more location in the environment that are outside the sensor range.

For example, the system can generate an updated object prediction for each location in the second region that includes a predicted likelihood that an object is at the location; the likelihood for a particular location represented in the surfel data and the likelihood for the particular location represented in the generated object prediction can be different, even though the second region was not observed in the sensor data.

After generating the updated prediction for the second region of the environment, the system can provide the prediction to a path planning system of the vehicle in order to generate a planned path for the vehicle. For example, the path planning system might generate a planned path that avoids the second region of the environment because the updated prediction includes a prediction that there is an obstacle in the second region (e.g., an obstacle that is not represented in the surfel data).

Instead or in addition, after generating the updated prediction for the second region of the environment, the system can provide the prediction to a system that maintains global surfel data which can be used by multiple other vehicles operating in the environment. For example, a path-planning system of the other vehicles can generate a planned path for the vehicles using data generated from the object predictions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining surfel data comprising a plurality of surfels, wherein:
- each surfel corresponds to a respective different location in an environment, and
- each surfel has associated data that comprises a respective class prediction for one or more classes of semantic information for a surface represented by the surfel;

obtaining sensor data for a plurality of locations in a first region of the environment, the sensor data having been captured by one or more sensors of a first vehicle;

determining, from the surfel data, a plurality of first surfels corresponding to respective locations in the first region of the environment;

determining, using the first surfels and the sensor data, a difference between i) a first representation of the first region of the environment corresponding to the first surfels and ii) a second representation of the first region of the environment corresponding to the sensor data; and generating a respective object prediction for one or more locations in a second region of the environment that is different than the first region of the environment using the surfel data and the determined difference.

Embodiment 2 is the method of embodiment 1, wherein:
the associated data for each surfel comprises a first prediction that characterizes a first likelihood that an object is at the location corresponding to the surfel;
the object prediction for each location comprises a second likelihood that an object is at the location; and
the first likelihood for a particular location and the second likelihood for the particular location are different.

Embodiment 3 is the method of any one of embodiments 1 or 2, wherein the second region of the environment is out of range of the one or more sensors of the first vehicle.

Embodiment 4 is the method of embodiment 3, wherein the second region is on a same road of a roadgraph characterizing the environment as the first region.

Embodiment 5 is the method of any one of embodiments 1-4, further comprising generating a planned path for the first vehicle, wherein generating the planned path comprises generating a path that avoids the second region of the environment.

Embodiment 6 is the method of any one of embodiments 1-5, further comprising providing the object predictions to a system that maintains global surfel data, wherein the global surfel data is used by a plurality of second vehicles.

Embodiment 7 is the method of embodiment 6, wherein an on-board system of a particular second vehicle generates a planned path for the particular second vehicle using data generated from the object predictions.

Embodiment 8 is the method of any one of embodiments 1-7, wherein the surfel data has been generated from data captured by one or more second vehicles navigating in the environment at respective previous time points.

Embodiment 9 is the method of any one of embodiments 1-8, wherein the plurality of classes of semantic information comprise one or more of: an object class, a reflectivity, an opacity, or a color.

Embodiment 10 is the method of any one of embodiments 1-9, wherein each surfel in the surfel data comprises:
coordinates in a three-dimensional coordinate system of the environment that characterize a position of the surfel in the environment, and
a normal vector that characterizes an orientation of the surfel in the environment.

Embodiment 11 is the method of any one of embodiments 1-10, wherein the surfel data comprises data characterizing a voxel gird, wherein each surfel in the surfel data corresponds to a different voxel in the voxel grid.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
obtaining surfel data comprising a plurality of surfels, wherein:
each surfel corresponds to a respective different location in an environment, and
each surfel has associated data that comprises a respective class prediction for one or more classes of semantic information for a surface represented by the surfel;
obtaining sensor data for a plurality of locations in a first region of the environment, the sensor data having been captured by one or more sensors of a first vehicle;
determining, from the surfel data, a plurality of first surfels corresponding to respective locations in the first region of the environment;
determining, using the first surfels and the sensor data, a difference between i) a first representation of the first region of the environment corresponding to the first surfels and ii) a second representation of the first region of the environment corresponding to the sensor data; and
generating a respective object prediction for one or more locations in a second region of the environment that is different than the first region of the environment using the surfel data and the determined difference.

2. The method of claim 1, wherein:
the associated data for each surfel comprises a first prediction that characterizes a first likelihood that an object is at the location corresponding to the surfel;
the object prediction for each location comprises a second likelihood that an object is at the location; and the first likelihood for a particular location and the second likelihood for the particular location are different.

3. The method of claim 1, wherein the second region of the environment is out of range of the one or more sensors of the first vehicle.

4. The method of claim 3, wherein the second region is on a same road of a roadgraph characterizing the environment as the first region.

5. The method of claim 1, further comprising generating a planned path for the first vehicle, wherein generating the planned path comprises generating a path that avoids the second region of the environment.

6. The method of claim 1, further comprising providing the object predictions to a system that maintains global surfel data, wherein the global surfel data is used by a plurality of second vehicles.

7. The method of claim 6, wherein an on-board system of a particular second vehicle generates a planned path for the particular second vehicle using data generated from the object predictions.

8. The method of claim 1, wherein the surfel data has been generated from data captured by one or more second vehicles navigating in the environment at respective previous time points.

9. The method of claim 1, wherein the plurality of classes of semantic information comprise one or more of: an object class, a reflectivity, an opacity, or a color.

10. The method of claim 1, wherein each surfel in the surfel data comprises:
coordinates in a three-dimensional coordinate system of the environment that characterize a position of the surfel in the environment, and
a normal vector that characterizes an orientation of the surfel in the environment.

11. The method of claim 1, wherein the surfel data comprises data characterizing a voxel gird, wherein each surfel in the surfel data corresponds to a different voxel in the voxel grid.

12. A system comprising one or more computers and one or more storage devices storing instructions that are operable, when executed by the one or more computers, to cause the one or more computers to perform operations comprising:
obtaining surfel data comprising a plurality of surfels, wherein:
each surfel corresponds to a respective different location in an environment, and
each surfel has associated data that comprises a respective class prediction for one or more classes of semantic information for a surface represented by the surfel;
obtaining sensor data for a plurality of locations in a first region of the environment, the sensor data having been captured by one or more sensors of a first vehicle;
determining, from the surfel data, a plurality of first surfels corresponding to respective locations in the first region of the environment;
determining, using the first surfels and the sensor data, a difference between i) a first representation of the first region of the environment corresponding to the first surfels and ii) a second representation of the first region of the environment corresponding to the sensor data; and
generating a respective object prediction for one or more locations in a second region of the environment that is different than the first region of the environment using the surfel data and the determined difference.

13. The system of claim 12, wherein:
the associated data for each surfel comprises a first prediction that characterizes a first likelihood that an object is at the location corresponding to the surfel;
the object prediction for each location comprises a second likelihood that an object is at the location; and
the first likelihood for a particular location and the second likelihood for the particular location are different.

14. The system of claim 12, wherein the second region of the environment is out of range of the one or more sensors of the first vehicle.

15. The system of claim 12, wherein the operations further comprise generating a planned path for the first vehicle, wherein generating the planned path comprises generating a path that avoids the second region of the environment.

16. The system of claim 12, wherein the operations further comprise providing the object predictions to a system that maintains global surfel data, wherein the global surfel data is used by a plurality of second vehicles.

17. One or more non-transitory computer storage media encoded with computer program instructions that when executed by a plurality of computers cause the plurality of computers to perform operations comprising:
obtaining surfel data comprising a plurality of surfels, wherein:
each surfel corresponds to a respective different location in an environment, and
each surfel has associated data that comprises a respective class prediction for one or more classes of semantic information for a surface represented by the surfel;
obtaining sensor data for a plurality of locations in a first region of the environment, the sensor data having been captured by one or more sensors of a first vehicle;
determining, from the surfel data, a plurality of first surfels corresponding to respective locations in the first region of the environment;
determining, using the first surfels and the sensor data, a difference between i) a first representation of the first region of the environment corresponding to the first surfels and ii) a second representation of the first region of the environment corresponding to the sensor data; and
generating a respective object prediction for one or more locations in a second region of the environment that is different than the first region of the environment using the surfel data and the determined difference.

18. The non-transitory computer storage media of claim 17, wherein:
the associated data for each surfel comprises a first prediction that characterizes a first likelihood that an object is at the location corresponding to the surfel;
the object prediction for each location comprises a second likelihood that an object is at the location; and
the first likelihood for a particular location and the second likelihood for the particular location are different.

19. The non-transitory computer storage media of claim 17, wherein the operations further comprise generating a planned path for the first vehicle, wherein generating the planned path comprises generating a path that avoids the second region of the environment.

20. The non-transitory computer storage media of claim 17, wherein the operations further comprise providing the object predictions to a system that maintains global surfel data, wherein the global surfel data is used by a plurality of second vehicles.

* * * * *